United States Patent Office 2,991,191
Patented July 4, 1961

2,991,191
METHOD OF APPLYING A PROTECTIVE COATING TO METAL
Earle T. Montgomery, Arnold P. Welch, and Joseph L. Bitonte, Columbus, Ohio, assignors to The Ohio State University Research Foundation, Columbus, Ohio, a corporation of Ohio
No Drawing. Original application May 10, 1949, Ser. No. 92,508, now Patent No. 2,775,531, dated Dec. 25, 1956. Divided and this application Aug. 31, 1956, Ser. No. 611,804
1 Claim. (Cl. 117—22)

The invention disclosed in this application relates in general to coatings for metals, and more particularly to processes for forming such coatings and for adhering such coatings to the metals to be coated; to articles comprising metals provided with such coatings; and to compositions of matter useful as such metal coatings. The embodiments of our invention disclosed in illustration thereof are particularly useful as coatings for withstanding high temperatures and protecting the coated metals at these temperatures; and the methods disclosed in illustration of our invention are particularly useful in forming such coatings and compositions, and in adhering such coatings and compositions to metals.

This application is a division of application Serial No. 92,508, filed May 10, 1949, and now Patent No. 2,775,531.

One of the objects of our invention is the provision of a new coating for metals which is not only resistant to high temperatures but also resistant to oxidation and is at the same time a thermal insulating coating.

A further object of our invention is the development of processes for forming such coatings and for adhering such coatings to the metal to be coated.

A further object of our invention is the provision of an article comprising a metal, having alloyed or sinter-bonded thereto, both a refractory and a heat and corrosion protective coating consisting of a sinter-bonded mixture of a metal or alloy and a ceramic component which may be, for example, a metal oxide.

Another object of our invention is the production of a new material or composition of matter with a combination of properties making it superior as a protective coating for metal (especially at high temperatures) to all coatings of the prior art, including the glass-type enamels.

Further objects and features of our invention will be apparent from the reading of the following specification and claim.

We have designated our compositions of matter as "cermets" inasmuch as they consist of a bonded mixture of extremely small particles of a ceramic material, such as a metal oxide, and small particles of a metal or metal alloy.

The compositions of matter, useful as coatings, with which we are primarily concerned herein are therefore bonded mixtures of small particles of ceramic materials and small particles of metals or alloys. One example of such a cermet coating is a composition consisting of a mixture of powdered nickel metal and powdered magnesium oxide (magnesia). The magnesia is preferably the electrically fused variety which has the greatest density and therefore a minimum shrinkage. The mixture of nickel and magnesia can be pressed into compacts or briquettes and sintered to agglomerate and sinter-bond the components by a wetting reaction and solid solution between the metal and the ceramic component through the media of a limited oxide film formed on the nickel particles. Then the composition can be further prepared by crushing the compacts and screening the powder preparatory to flame-spraying. The coating composition is then ready for direct application to parts formed of sheet-metal, or other metal parts, by flame-spraying with an oxyacetylene powder gun.

Alternatively, the raw and unsintered mixed powders alone; the sintered and ground powder alone; or a mixture of raw powder and sintered powder, may be applied to the metal part to be coated, by a different process. For example, the coating in one of these forms, may be initially adhered by cold application using a fluid vehicle such as a solution of sodium silicate in water, by any of the coating methods known to the art and commonly employed for the application of enamels, lacquers or paints. After drying the coating so initially applied, the coating may be torched with an oxyacetylene torch flame to agglomerate and sinter-bond the materials of which the coating is composed to each other and to the metal part, and preferably to alloy the metal or alloy component of the coating to the metal part being coated. The same results may be obtained by furnace sintering.

When the mild steels are to be coated by cold application of the coating, as described above, which application is to be followed by torching or furnace sintering, it has been found that the application of an undercoat of flame sprayed or electroplated nickel, or other oxidation resistant metal, onto the mild steel promotes better adherence because it inhibits the development of an oxide film on the mild steel at the interface between the steel and the coating, during the drying and subsequent torching or furnace sintering operation.

We prefer very much that the surface to be coated should be sand-blasted before applying the coating.

Of the many metals which are suitable for use in our process, we prefer nickel, cobalt, aluminum, and iron, or alloys of these metals. By listing only four metals we do not limit ourselves thereto. By the term "alloys of these metals" we do not intend to limit ourselves to inter alloys of the four metals mentioned, but we include alloys of any of these four or any other suitable metals with any of the others or with any suitable metal such as, for example, with chromium, columbium, tantalum, titanium, tungsten or zirconium. By "metals" we include any suitable metals or any suitable alloy of such metals and we so define the words "metal" and "metals" as used hereinafter in this specification and in the claim. Of the many metal oxides we prefer alumina, beryllia, magnesia, silica, and zirconia. We do not, however, wish to limit ourselves to the five oxides mentioned. We have tested more thoroughly than other coatings, those consisting of mixtures of magnesia and nickel. Of course, metals (e.g., chromium) other than those listed above, are also useful, an oxides and even other similar compounds (e.g., silicon carbide) other than the ones listed may also be useful as ceramics in our process of preparing coatings as also may be mixtures of suitable oxides. However, we prefer zirconia or magnesia as a ceramic component. The degree of usefulness of a given coating varies with the metal and ceramic component selected—and with the metal to be coated. The degree of usefulness varies in fact to a large extent depending on the degree with which the metal and the ceramic component selected, wet each other and in turn wet or alloy with the metal to be coated. The usefulness also varies with the temperature to which the coating is subjected in use. The greater the degree of wetting or agglomeration there is, the greater is the usefulness of the combination, provided the combination will also alloy with the metal to be coated, and is sufficiently refractory for a given service.

We have found that when we sinter-bond a mixture of fine particles of a metal and a ceramic component to a metal sheet, for example, we can produce a coating which will withstand much higher temperatures than have been previously possible with any coatings known in the prior art and even higher than the temperatures which can be withstood by the metal itself. At the same time the coating protects the sheet from oxidation and corrosion; provides some thermal insulation, i.e., reduces the density of heat transfer; and increases the normal temperature differential between the heated and unheated surfaces.

In sinter-bonding or alloying the coating to the metal to be coated, we reduce the particle size of the presintered powder, and of both the metal component and the ceramic component comprising the cold coating mixture, to extremely small particles. The size of such particles is not critical, but for flame spraying, the material should be less than 325 mesh for the presintering operation and then after presintering, ground and screened to provide particles having a size of less than 100 mesh (149 microns) and greater than 325 mesh (44 microns), the screens used being U.S. Standard brass sieves. The material for cold application should be less than 325 mesh (44 microns and finer).

Then we adhere the mixture by flame-spraying or torching. In flame-spraying the material passes through the flame. In heating particles of such size to the temperatures attained by them in flame-spraying, the metal particles bonded to the ceramic component of the presintered powder, reach, we believe, the plastic or tacky stage in the oxyacetylene flame, while in torching a mixed sintered and unsintered powder, it appears that in many cases a film of the oxide of the metal component forms on the surface of the metal or alloy component and this metal oxide film goes into solid solution with the ceramic component. In other cases we believe that there is a sinter-bonded agglomeration only, without wetting or solid solution. Although the temperatures used are not necessarily critical for all mixtures, the optimum temperature being dependent on the components, yet we prefer usually to sinter at temperatures within ranges producing the conditions above referred to.

In bonding the particles to each other and to the metal to be coated, we use a variety of methods. We may flame-spray the presintered and ground mixture of metal component and ceramic component particles onto the surface to be coated. In so flame-spraying, we use a commerical "Powder-Weld" oxyacetylene powder gun. In the case of this oxyacetylene powder gun or other similar types of high temperature torch guns, the flame may be surrounded with neutral nitrogen gas.

Alternatively, we may make an application of (1) presintered and ground coating alone, (2) a raw mixture of metal component and ceramic component particles, or (3) a combination of (1) and (2), by using a fluid vehicle, and spraying, brushing, dipping, or applying by any other usual means, and after drying, either torch the coating with an oxyacetylene torch flame to sinter-bond the materials of the coating and alloy or sinter-bond the coating to the metal part being coated, or accomplish the same results by furnace sintering.

In preparing the mixture of fine metal or alloy and ceramic component particles, we may grind the materials separately then mix them together prior to presintering in the form of a compact, or prior to applying them raw and unsintered as a coating. For flame-spraying, which is our preferred method of application, we presinter the mixture. To do so we grind the materials and mix them together and then form them into a briquette or compact by pressing (or otherwise) and sinter by heating the briquettes or compacts in a furnace, to a temperature which will agglomerate and/or sinter-bond the components. An oxidizing, neutral, or reducing atmosphere may be used in the furnace depending on the composition and on whether or not a passivated skin is formed on the compacts. After sintering the compacts or briquettes, they are crushed to a fine powder of the order of less than 100 mesh (149 microns and finer) and greater than 325 mesh (44 microns) and then applied as the coating.

Direct flame-spraying of presintered powder, regardless of the character of the components, is the preferred method of applying the coating wherever the dimensions of the part to be coated will permit. In such process the presintered and ground powder is sprayed through a torch flame as for example an oxyacetylene torch, in such manner that the heated particles impinge on the surface being coated. For good adherence of the flame-sprayed powder, the angle of incidence should be as near 90° as possible, although good adherence can be obtained with as low an angle as 45°. There are often situations, however, where the dimensions of the part to be coated on its inner surface will neither permit the entrance of the gun with the necessary clearance for flame-spraying, nor permit spraying the interior at an advantageous angle from a position outside the part. In such cases, either for the reasons just explained, for reasons of cost or practicability in building up thicker coats, or for adaptation to production line processing, we have recourse to the cold method of application of the coating, as described above, followed by torching with an oxyacetylene torch flame or by furnace sintering.

So far as we know, we are the first to produce refractory, protective, thermal insulating, and hard surface coatings for metals, said coatings consisting of a mixture of a metal or alloy powder (or flake) and a ceramic or non-metal powder. Adherence of the coating to the metal part to be coated is achieved, we believe, by an alloying reaction between the metal of the coating and the metal base. However, certain coating compositions will not alloy with certain metal bases and in such cases a purely mechanical adherence is achieved which is useful for applications where the part is not subject to thermal cycling.

This type of refractory coating has been developed particularly for service in a temperature range above that in which the glass-type enamel ground coats, and the glass-bonded refractory cover coats for enamels are useful. The plastic stage of the most refractory high temperature enamels is still below the plastic stage of the metals to which they can be applied. Also, enamels which can be applied at temperatures even as high as from 2300° to 2350° do not have an effective life even at temperatures of from 1800° F. to 2000° F.

The proportion of metal or alloy to ceramic material in the cermet coating depends to some extent on the materials. However, we prefer to use compositions within the range of a mixture having 25% metal and 75% ceramic material to a mixture having 75% metal and 25% ceramic material. One very satisfactory composition consists of 66.7% ground nickel and 33.3% ground electrically fused magnesia (both percentages by weight).

Following are specific examples of the practice of various embodiments of our inventions.

*Example I*

Following is a description of our preferred method of preparing nickel-magnesia coating #10 for flame-spraying; and a description of the spraying technique.

We obtained commercial electrically fused magnesia of the fineness of 325 mesh and finer (approx. less than 44 microns) and commercial nickel metal of the same fineness. We mixed together 200 grams (33.3%) magnesia and 400 grams (66.7%) nickel, by dry grinding together for 30 minutes in a steel ball mill with steel balls. After mixing, the powder was moistened with 8% water containing a small amount of an organic binder (such as for example a starch suspension). It was then pressed into compacts in a steel die, using approximately 12,000 p.s.i. After drying at 250° F., the compacts were introduced into a Globar furnace with normal oxidizing atmosphere, which had previously been brought to the temperature of 2550° F. The compacts were sintered by soaking at this temperature for 30 minutes. After cooling, the compacts were crushed, the material was passed through a disc pulverizer, and screened in a Rotap machine using U.S. Standard screens 100 mesh and 325 mesh. The fraction which passed the 100 mesh screen but was retained on the 325 mesh screen, was used for flame-spraying by means of a "Powder-Weld" oxyacetylene flame powder gun.

The metal surface to be flame-sprayed was cleaned and roughened by grit blasting using a sharp and fairly coarse silica sand or silicon-carbide grit. The coating was applied by the same technique as used for flame-spraying metal powders, which is well known to the art. The coating is accomplished without undue heating of the target (the metal part being coated). The temperature attained by the target is controlled by the distance from the gun to the target. Just enough heat is used to alloy a given coating to a given metal base.

Example II

As described in the specification, a cermet coating may be initially adhered to the metal part to be coated, by cold application in any one of three forms: (1) presintered and ground powder alone, (2) raw and unsintered mixed powders alone, or (3) a mixture of presintered powder and raw (unsintered) mixed powders.

Following is a description of our preferred method of preparing nickel-magnesia coating #10 for cold application, using a mixture of presintered powder and raw powder; and a description of the technique of application. We obtained commercial electrically fused magnesia of the fineness of 325 mesh and finer (approx. less than 44 microns) and commercial nickel metal of the same fineness. In addition we obtained by the process described under Example I, presintered #10 Ni-MgO coating material of the fineness of 325 mesh and finer. We mixed together 100 grams (16.7%) magnesia, 200 grams (33.3%) nickel and 300 grams (50.0%) presintered material of Example I, by dry grinding together for 30 miuntes in a steel ball mill with steel balls. After mixing, the powder was brought to the consistency of a slurry by stirring with a 30% sodium silicate solution and then brushed on the article to be coated, the surface of which had been cleaned and roughened by sandblasting. The coating, so applied, was dried by infra-red radiation and finally in a conventional drier at 250° F. We then matured the coating through agglomeration and sinter-bonding, and alloyed it to the metal part being coated by torching the coated surface with an oxyacetylene torch flame within the range 2100° F. to about 2500° F. Alternatively, this coating, as here described, has been initially applied by spraying instead of brushing, using a conventional glaze or enamel gun.

Example III

Following is a description of the preparation of one composition of our aluminum-alumina coating for flame-spraying.

We obtained commercial calcined alumina reduced to particle size of about 44 microns and finer, and commercial aluminum flake reduced to a thickness of about 5 milli-microns. We mixed together 150 grams (50%) alumina and 150 grams (50%) aluminum in a porcelain mortar. After mixing, the material was dampened with 10% water containing a small amount of organic binder and pressed into compacts, using approximately 1200 p.s.i. These were dried slowly to 600° F. and sintered by placing in a furnace having a normal oxidizing atmosphere which had previously been brought to a temperature of 2500° F., and then soaking the compacts in this furnace for 8 minutes to agglomerate and sinter-bond the components. In sintering these compacts as here described, a tight and passivated skin of aluminum oxide forms on all surfaces of the compact, leaving the metal content of the interior in the metallic state. The compacts were then crushed, ground, and screened as described under Example I. The fraction which passed the 100 mesh screen but was retained on the 325 mesh screen, was used for flame-spraying as described under Example I.

Example IV

Following is a description of our preferred method of preparing nickel-zirconia coating for flame-spraying.

We obtained commercial fused, stabilized zirconia of the fineness of 325 mesh and finer (approx. less than 44 microns) and commercial nickel metal of the same fineness. We mixed together 200 grams (33.3%) zirconia and 400 grams (66.7%) nickel, by dry grinding together for 30 minutes in a steel ball mill with steel balls. After mixing, the powder was moistened with 8% water containing a small amount of temporary binder: It was then pressed into compacts in a steel die, using approximately 12,000 p.s.i. After drying at 250° F., the compacts were sintered by placing in a furnace having a normal oxidizing atmosphere and which had previously been brought to a temperature of 2550° F., and then soaking the compacts in this furnace for 30 minutes to agglomerate and sinter-bond the components. The compacts were then crushed, ground, and screened as described under Example I. The portion which passed the 100 mesh screen but was retained in the 325 mesh screen, was used for flame-spraying as described under Example I.

Example V

Following is a description of our preferred method of preparing cobalt-magnesia coating for flame-spraying.

We obtained commercial electrically fused magnesia of the fineness of 325 mesh and finer (approx. less than 44 microns) and commercial cobalt metal of the same fineness. We mixed together 200 grams (33.3%) magnesia and 400 grams (66.7%) cobalt, by dry grinding together for 30 minutes in a steel ball mill with steel balls. After mixing, the powder was moistened with 8% water containing a small amount of temporary binder. It was then pressed into compacts in a steel die, using approximately 12,000 p.s.i. After drying at 250° F., the compacts were sintered by placing in a furnace having a normal oxidizing atmosphere which had previously been brought to a temperature of 2550° F., and then soaking the compacts in this furnace for 20 minutes to agglomerate and sinter-bond the components. The compacts were then crushed, ground, and screened as described under Example I. The portion which passed the 100 mesh screen but was retained on the 325 mesh screen, was used for flame-spraying as described under Example I.

In addition mixtures of nickel and zirconia and mixtures of cobalt and magnesia have each been used separately to form nickel-zirconia or cobalt-magnesia coatings by cold application in a manner analogous to that described under Example II.

It is to be understood that the above described embodiments of our invention are for the purpose of illustration only and various changes may be made without departing from the spirit and scope of our invention.

We claim:

A method of applying a protective coating to a metal article which comprises mixing nickel metal particles of the fineness of 325 mesh and finer and magnesia particles of the fineness of 325 mesh and finer in proportions of about 66⅔% by weight of particles of the metal and about 33⅓% by weight of the particles of metal oxide; compacting the particles; sintering in an oxidizing atmosphere and at an oxidizing temperature; regrinding the sintered mixture to particles of less than 325 mesh; applying said particles while relatively cold to the article to be coated, and heating the article coated with said particles in a furnace at a temperature sufficiently high to sinter said particles to each other and adhere them to the article to be coated.

References Cited in the file of this patent

UNITED STATES PATENTS

| | | |
|---|---|---|
| 704,793 | Griffith | July 15, 1902 |
| 1,922,254 | McCulloch | Aug. 15, 1933 |
| 2,161,597 | Swartz | June 6, 1939 |
| 2,496,971 | Wiczer | Feb. 7, 1950 |

FOREIGN PATENTS

| | | |
|---|---|---|
| 27,172 | Great Britain | 1903 |
| 543,773 | Great Britain | Mar. 12, 1942 |
| 596,626 | Great Britain | Jan. 7, 1948 |